United States Patent [19]

Nozaki et al.

[11] Patent Number: 5,671,797
[45] Date of Patent: Sep. 30, 1997

[54] PRESSURE CASTING METHOD THROUGH PRESSURIZING PIN ADVANCEMENT SPEED CONTROL

[75] Inventors: Mikiya Nozaki, Toyota; Mitsuhiro Karaki, Okazaki; Mitsuru Inui, Gifu-ken; Takehito Futamura; Akira Saitoh, both of Gifu, all of Japan

[73] Assignees: Toyota Jidosha Kabushiki Kaisha, Toyota; Gifu Seiki Kogyo Kabushiki Kaisha, Tokyo, both of Japan

[21] Appl. No.: 516,363

[22] Filed: Aug. 17, 1995

[30] Foreign Application Priority Data

Aug. 18, 1994 [JP] Japan .................................. 6-194208
Jun. 12, 1995 [JP] Japan .................................. 7-144857

[51] Int. Cl.⁶ ........................... B22D 27/11; B22D 47/00
[52] U.S. Cl. ........................... 164/120; 164/4.1; 164/457
[58] Field of Search ........................... 164/120, 319, 164/320, 321, 4.1, 155.1, 154.8, 457

[56] References Cited

U.S. PATENT DOCUMENTS

| 4,147,200 | 4/1979  | Warsinski et al. |         |
|-----------|---------|------------------|---------|
| 4,488,589 | 12/1984 | Moore et al.     |         |
| 4,493,362 | 1/1985  | Moore et al.     |         |
| 4,559,991 | 12/1985 | Motomura et al.  |         |
| 4,932,458 | 6/1990  | Iwamoto et al.   |         |
| 5,119,866 | 6/1992  | Mihara           | 164/120 |

FOREIGN PATENT DOCUMENTS

| 0 512630  | 11/1992 | European Pat. Off. |         |
|-----------|---------|--------------------|---------|
| 39 10146  | 11/1989 | Germany.           |         |
| 5-146860  | 6/1993  | Japan              | 164/457 |

OTHER PUBLICATIONS

Patent Abstracts of Japan, vol. 16, No. 494, JP-A-4-182053, Jun. 29, 1992.
Giesserei, vol. 80, No. 8, pp. 247–252, Apr. 19, 1993, Rolf Frey, "System Zur Statistichen Prozessueberwachung Beim Druckgiessen".

*Primary Examiner*—Scott A. Smith
*Assistant Examiner*—I.-H. Lin
*Attorney, Agent, or Firm*—Oblon, Spivak, McClelland, Maier & Neustadt, P.C.

[57] ABSTRACT

A pressure casting method is disclosed, which permits sufficient pressurizing effect to be obtained for the entire molten metal by varying the speed of advancement of a pressurizing pin according to the state of solidification of the molten metal during pressurizing. In pressure casting using a pressure casting apparatus, while charged molten metal is solidified, it is pressurized by causing advancement of the pressurizing pin into a cavity of the die. During this time, the reaction force received by the pressurizing pin from the molten metal is measured by a pressure sensor, and the speed of advancement of the pressurizing pin is varied through control of the opening degree of a flow control valve according to the measured reaction force. While the reaction force during the progress of solidification of molten metal is high, the flow control valve is controlled to a high opening degree to provide for a high speed of advancement of the pressurizing pin so as to apply a high pressurizing force. On the other hand, while the reaction force is low so that there is a delay in the solidification of molten metal, the speed of advancement is reduced so that no pressurizing force is applied until completion of solidification of molten metal. The pressurizing pin is advanced while its advancement speed is controlled in the above way, and pressurizing over the entire stroke is completed.

9 Claims, 7 Drawing Sheets

PRESSURE CASTING METHOD THROUGH PRESSURIZING PIN ADVANCEMENT SPEED CONTROL

BACKGROUND OF THE INVENTION

1. Field of the Invention

This invention relates to a pressure casting method in which molten metal charged in a cavity is pressurized by causing advancement of a pressurizing pin during solidification of the molten metal.

2. Description of the Prior Art

In die-casting or like casting techniques, there is a technique of pressure casting in which molten metal charged in a cavity is pressurized during solidification in order to prevent such defects as sink marks and shrinkage cavities which might otherwise be generated with solidification and shrinkage of the molten metal. In such pressure casting, it is very important for effective pressurizing to adequately set the timing of operating pressurizing means such as a pressurizing pin.

Various methods have been developed to adequately set the timing of pressurizing with a pressurizing pin, and one example of such method is disclosed in Japanese Laid-Open Patent Publication No. 4-182053. In this disclosed technique, after charging of molten metal into a cavity, the pressurizing pin is advanced at very low speed by a pressurizing pin driving cylinder. Subsequently, upon reaching a predetermined value by the reaction force received by the pressurizing pin from molten metal, it is judged that a predetermined state of solidification of molten metal has been obtained, and advancement speed of the pressurizing pin is increased to a predetermined high speed for pressurizing the molten metal.

In this way, the pressure casting is carried out by detecting the timing of pressurizing from the reaction force received by the pressurizing pin being advanced at very low speed.

A technical subject in the prior art is to detect adequate timing at which pressurizing is started, and to this end, various methods have been disclosed in addition to the above disclosed method. However, any of these prior art techniques is only for detecting the adequate timing for starting pressurizing, and has no consideration about phenomena during pressurizing.

Molten metal charged into the cavity is not always cooled at a fixed rate. For example, when a cooled die is used for casting, molten metal is quickly cooled and quickly solidified. On the other hand, after repeated casting, the die temperature has been elevated and therefore, molten metal is cooled down at lower rate. Time until cooling of the molten metal inside the cavity to a predetermined temperature after reaching a certain fixed temperature by a portion of molten metal in contact with the pressurizing pin, varies with the cooling rate. In other words, the adequate timing for pressurizing the molten metal inside the cavity by causing advancement of the pressurizing pin, varies with the cooling rate. Therefore, with the mere control of the timing of the start of pressurizing as in the prior art, it is impossible to obtain appropriate control of the timing for pressurizing the molten metal inside the cavity during the pressurizing process, particularly, in the latter half thereof.

There has also been well known a technique in which the pressurizing force is increased to a higher level in the latter half of the advancement of the pressurizing pin. In this case, however, the two different pressurizing forces are predetermined, and the speed of advancement of the pressurizing pin is not controlled according to the speed of progress of solidification.

SUMMARY OF THE INVENTION

An object of the invention is to permit control of the speed of advancement of the pressurizing pin according to the speed of progress of solidification during the advancement of the pressurizing pin so that the pressurizing period is neither too short nor too long compared to the speed of progress of solidification.

Another object of the invention is to permit proper correspondence between the speed of advancement of the pressurizing pin and the speed of progress of solidification to be obtained by accurately detecting the speed of progress of solidification.

According to one aspect of the invention, the reaction force received by the pressurizing pin from molten metal is measured, and the speed of advancement of the pressurizing pin is increased when the measured reaction force is high and reduced when the reaction force is low.

When the reaction force received by the pressurizing pin from molten metal during advancement of the pressurizing pin is high, the molten metal being solidified under the pressure applied by the pressurizing pin has been solidified to be comparatively harder. At this moment, the pressurizing pin advancement timing has been retarded. In this case, the pressurizing pin advancement speed is increased to eliminate the delay. When the reaction force is low, on the other hand, the molten metal being solidified under pressure applied by the pressurizing pin has not yet been sufficiently solidified, and the pressurizing pin advancement timing has been advanced. In this case, the pressurizing pin advancement speed is reduced to eliminate the status of being too early. In this way, the pressurizing pin advancement speed and the solidification progress speed are made to correspond to each other.

For accurate control of the pressurizing pin advancement speed, it is suitable to take, in addition to the reaction force, the speed of advancement and/or temperature of the pressurizing pin into consideration. By taking these elements into consideration, it is possible to obtain more accurate correspondence between the pressurizing pin advancement speed and the solidification progress speed.

BRIEF DESCRIPTION OF THE DRAWINGS

The above and other objects, features and advantages of the invention will become more apparent from the following detailed description of the preferred embodiments when the same is read with reference to the accompanying drawings, in which.

DETAILED DESCRIPTION OF THE PREFERRED EMBODIMENTS

First Embodiment

Figure 1:
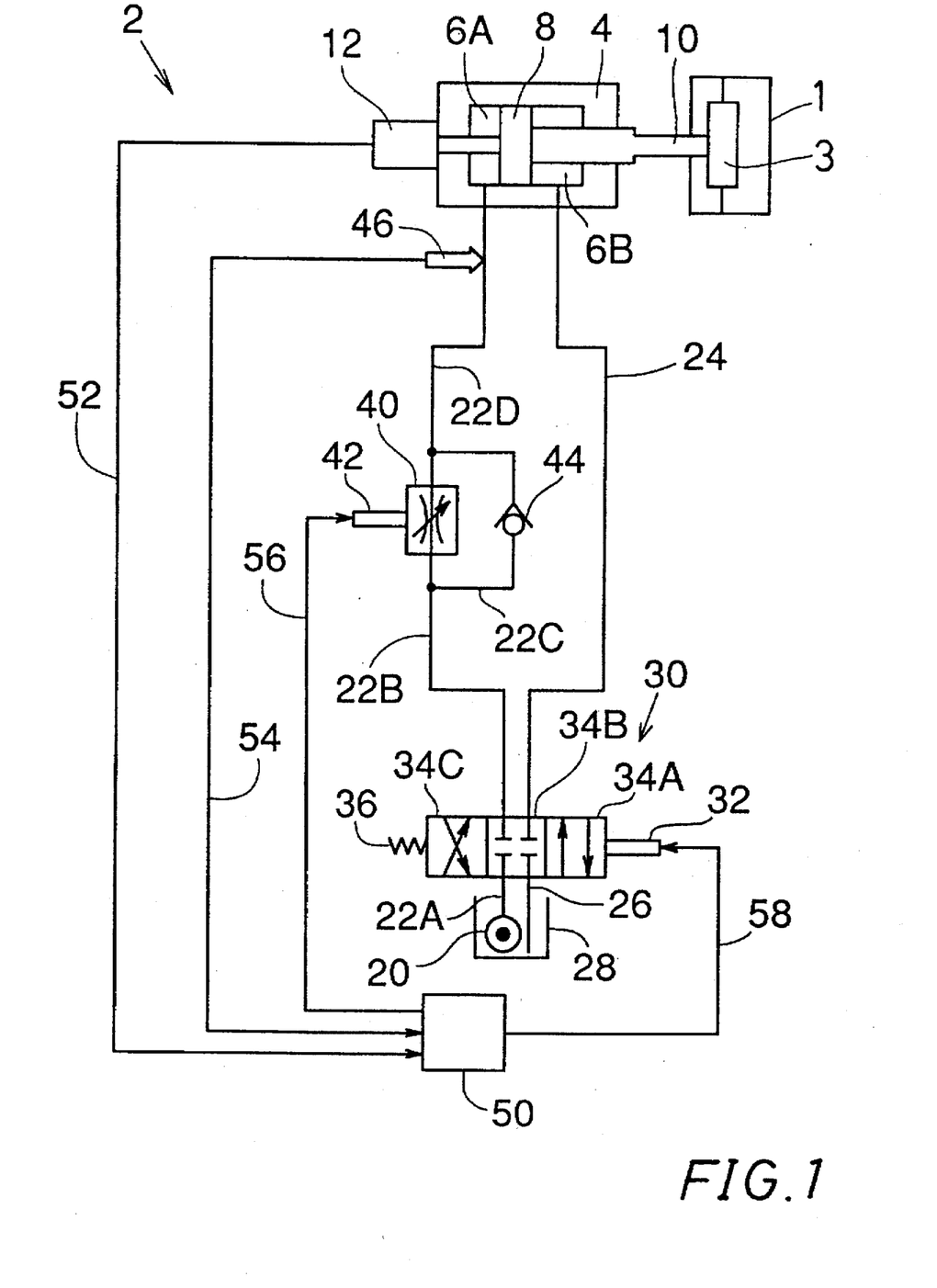
FIG. 1 is a schematic representation of the overall construction of a pressure casting apparatus used in a pressure casting method according to a first embodiment of the invention.
Figure 2:
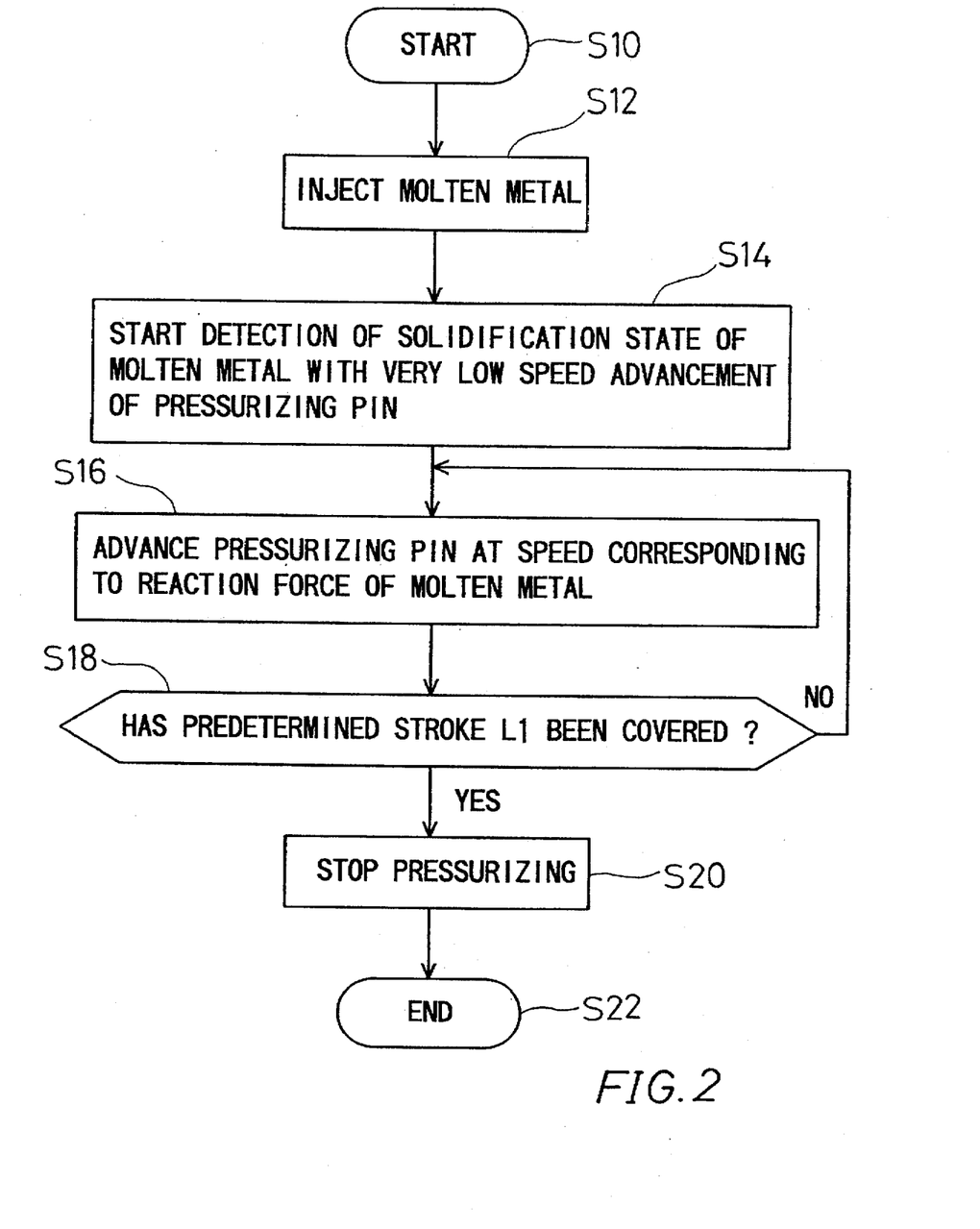
FIG. 2 is a flow chart illustrating a pressure casting routine in the pressure casting method according to the first embodiment.

Now, a first embodiment of the invention will be described with reference to FIGS. 1 and 2. First, the overall construction of a pressure casting apparatus used in a pressure casting method of this embodiment will be described with reference to FIG. 1. As shown in FIG. 1, the pressure casting apparatus 2 used in this embodiment has a pressurizing pin 10. The pressurizing pin 10 has a front or free end extending into a cavity 3 in a die 1, and its rear end is secured to a piston 8 of a pressurizing oil hydraulic cylinder 4 and is advanced and retreated in unison with the piston 8 with operation of an oil hydraulic system.

The oil hydraulic system of the pressure casting apparatus 2 includes an oil hydraulic pressure generator (or oil hydraulic pump) 20, an electromagnetic directional control valve 30, a flow control valve 40 and oil hydraulic duct lines connecting these components.

Oil hydraulic operating fluid provided under pressure from the oil hydraulic pressure generator 20, is led through an oil hydraulic duct line 22A, the electromagnetic directional control valve 30, an oil hydraulic duct line 22B, the flow control valve 40 and an oil hydraulic duct line 22D to a rear chamber 6A of the pressurizing oil hydraulic cylinder 4. Obviously, the oil hydraulic pump 20, the oil hydraulic cylinder 4 and the duct lines 22A and 22D connecting the pump 20 and the cylinder 4 constitute an actuator for the pressurizing pin 10. The output of the actuator is controlled by the flow control valve 40. The flow control valve 40 is incorporated in the duct lines. It is possible as well to control the actuator output through control of the discharge pressure or discharge rate of the oil hydraulic pump 20.

An oil hydraulic duct line 22C branches from the oil hydraulic duct line 22B connected to the flow control valve 40. A check valve 44 is provided on the oil hydraulic duct line 22C. The oil hydraulic duct line 22C joins the oil hydraulic duct line 22D connecting the flow control valve 40 and the rear chamber 6A of the oil hydraulic cylinder 4.

An oil hydraulic line 24 is connected to a front chamber 6B of the pressurizing oil hydraulic cylinder 4, and it constitutes an oil hydraulic return line through the electromagnetic directional control valve 30 and an oil hydraulic duct line 26 to an oil hydraulic operating fluid tank 28.

The opening degree of the flow control valve 40 and the valve chamber position of the electromagnetic directional control valve 30 are controlled by control signals supplied from a control computer 50 through respective control signal lines 56 and 58.

The electromagnetic directional control valve 30 has three valve chambers 34A, 34B and 34C. When an electromagnetic solenoid 32 is rendered inoperative, the valve chamber 34C is connected to each duct line by the biasing force of a spring 36. Thus, the duct lines 22A and 24 and also duct lines 22B and 26 are communicated with each other, and oil hydraulic pressure is led through the duct lines 22A and 24 to the front chamber 6B of the pressurizing oil hydraulic cylinder 4. As a result, the piston 8 is retreated, allowing oil hydraulic operating fluid in the rear chamber 6A to return through the duct line 22D, the check valve 44 and the duct lines 22C, 22B and 26 to the tank 28.

When the electromagnetic solenoid 32 is controlled by the control computer 50 to a low energizing force state, the valve chambers are changed against the biasing force of the spring 36, and a state shown in FIG. 1 is brought about in which the central valve chamber 34B is connected to each duct line. That is, each of the duct lines 22A, 22B, 24 and 26 is connected to a closed state port, thus blocking the pressurizing oil hydraulic cylinder 4 from the oil hydraulic pressure generator 20. As a result, the piston 8 is stopped.

When the electromagnetic solenoid 32 is controlled to a high energizing force state, the valve chamber 34A is connected to each duct line, and oil hydraulic pressure is led through the oil hydraulic duct lines 22A and 22B and the flow control valve 40 to the rear chamber 6A of the pressurizing oil hydraulic cylinder 4. As a result, the piston 8 is advanced, allowing operating fluid in the front chamber 6B to return through the duct lines 24 and 26 to the tank 28.

At this time, the speed of advancement of the piston 8 (i.e., pressurizing pin 10) is determined by the rate of flow of oil hydraulic operating fluid supplied to the rear chamber 6A of the pressurizing oil hydraulic cylinder 4. The flow rate of fluid is controlled according to the opening degree of the flow control valve 40.

As described before, the opening degree of the flow control valve 40 is controlled according to the control signal which is supplied from the control computer 50 through the control signal line 56 to the electromagnetic solenoid 42.

A pressure sensor 46 is mounted on the oil hydraulic duct line 22D. The pressure sensor 46 measures the magnitude of the oil hydraulic pressure added to the rear chamber 6A of the pressurizing oil hydraulic cylinder 4, i.e., reaction force received by the pressurizing pin 10 from molten metal. The measurement data from the pressure sensor 46 is inputted through a measurement signal line 54 to the control computer 50.

The pressurizing oil hydraulic cylinder 4 includes a differential transformer 12 serving as a position sensor. The differential transformer 12 accurately measures the displacement of the pressurizing piston 8, i.e., the displacement of the pressurizing pin 10. The measurement data of the displacement is inputted through a measurement signal line 52 to the control computer 50.

Now, the procedure of a pressure casting method using the pressure casting apparatus having the construction described above, will be described with reference to the flow chart of FIG. 2 as well as FIG. 1. The flow chart of FIG. 2 illustrates a pressure casting routine in the pressure casting apparatus of this embodiment.

At the instant of starting the pressure casting, the piston 8 of the pressurizing oil hydraulic cylinder 4 is in its retreated position. Also, the electromagnetic directional control valve 30 is in its fully closed state with its valve chamber 34B connected to each duct line (i.e., state shown in FIG. 1). Further, the opening degree of the flow control valve 40 has been adjusted such that the rate of flow of oil hydraulic operating fluid through the valve 40 is such as to cause advancement of the piston 8 at very low speed.

When the control is started in Step S10, an injecting plunger (not shown) is advanced to inject molten metal through a sprue, a runner and a gate of the die 1 into the cavity 3 (Step S12). When a predetermined period of time has passed from the completion of molten metal injection, an operation of detecting the state of solidification of the molten metal is started (Step S14). More specifically, the electromagnetic directional control valve 30 is opened, allowing a very small amount of oil hydraulic operating fluid to be supplied through the flow control valve 40 to the rear chamber 6A of the pressurizing oil hydraulic cylinder 4 to cause advancement of the pressurizing pin 10 at very low speed.

At the same time, the control computer 50 computes the reaction force received by the pressurizing pin 10 from molten metal on the basis of measurement data inputted from the pressure sensor 46 through the measurement signal line 54. The control computer 50 also determines the speed of advancement of the pressurizing pin 10 corresponding to the reaction force thus computed, and the opening degree of the flow control valve 40 is controlled to provide the determined speed of advancement. Thus, the pressurizing pin 10 is advanced at the speed corresponding to the reaction force of molten metal (Step S16). The speed of advancement is controlled to be the higher the higher the reaction force and the lower the lower the reaction force.

Subsequently, a check is made as to whether a predetermined stroke L1 has been reached by the displacement of the pressurizing pin 10 measured by the differential transformer 12 (Step S18). The predetermined stroke L1 is the magnitude of the pressurizing stroke of the pressurizing pin 10, and is stored in a memory of the control computer 50. If the result of the check in Step S18 is "NO", the routine goes back to Step S16, and the pressurizing pin 10 is further advanced under the control as described above. At this time, the speed of advancement is controlled to be the higher the higher the reaction force. Steps S16 and S18 are executed repeatedly.

If the result of the check in Step S18 is "YES", the valve chamber 34B of the electromagnetic directional control valve 30 is connected to each duct line, thus stopping the pressurizing pin 10. Then, when further a predetermined period of time has passed, the electromagnetic directional control valve 30 is switched to a state that the valve chamber 34C is connected to each duct line, to thereby cause the pressurizing pin 10 to retreat to the initial position (Step S20), thus bringing an end to the pressuring (Step S22).

After the molten metal has been sufficiently solidified by cooling, the die is opened, and the cast product is taken out from the cavity 3, thus completing one cycle of casting.

As has been described, in the pressure casting apparatus 2 of this embodiment, the reaction force received by the pressurizing pin 10 from molten metal as the pin 10 is advanced is measured, and the speed of advancement of the pressurizing pin 10 is varied according to the measured reaction force. In this way, as the pressurizing pin 10 is advanced, the speed thereof is controlled adequately for completing the pressurizing by the entire stroke L1.

Thus, pressurizing is effected at the speed of advancement corresponding to the solidified state of each portion of molten metal, so that satisfactory pressurizing effect can always be obtained for each portion of the pressurizing stroke L1 of the pressurizing pin 10. Since such operation is made over the entire stroke L1 of the pressurizing pin 10, it is possible to obtain sufficient pressurizing effect over the entire molten metal to be pressurized.

While in this embodiment, the differential transformer 12 is used as a position sensor for measuring the displacement of the pressurizing pin 10, it is possible as well to employ a potentiometer, a linear encoder, a laser measuring instrument, etc. as means for measuring the displacement of the pressurizing pin 10.

Further, while the speed of advancement of the pressurizing pin 10 is controlled by using a predetermined relation between the flow rate of oil hydraulic operating fluid and the speed of advancement of the pressurizing pin, it is possible as well to adopt a system of feedback control according to the measurement of the actual speed of advancement of the pressurizing pin 10. This system permits more accurate speed control of the pressurizing pin. In this case, it is possible to adopt as the method of measurement of the actual speed of advancement one in which the control computer 50 computes the speed from displacement and time data provided by the differential transformer 12. Further, the system may include means for directly measuring the speed, such as a tachometer.

Second Embodiment

Now, a second embodiment of the invention will be described with reference to FIGS. 3 and 4. The overall construction of a pressure casting apparatus used in a pressure casting method of this embodiment, is just the same as that in the first embodiment. Its description will not be repeated, and FIG. 1 is referred to, as necessary.

The routine of pressure casting in the pressure casting method of this embodiment, will first be described with reference to FIG. 3. FIG. 3 is a flow chart illustrating the routine of pressure casting in the pressure casting method of this embodiment.

Figure 3:
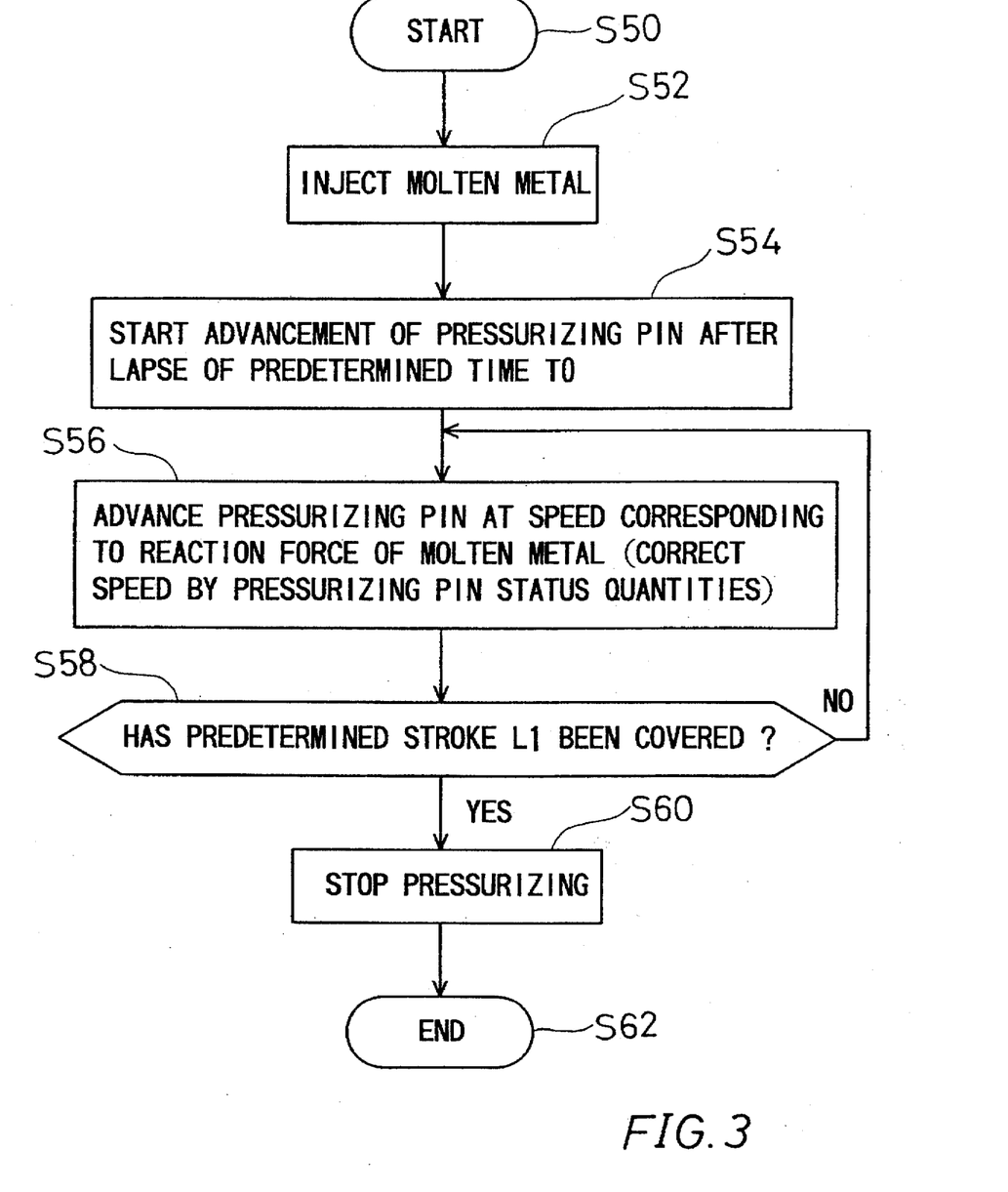
FIG. 3 is a flow chart illustrating a pressure casting routine in a pressure casting method according to a second embodiment of the invention.

As is seen from FIG. 3, the routine of pressure casting in this embodiment is the same as that in the first embodiment except for that in this embodiment, in lieu of determining the timing of pressurizing with very low speed advancement of the pressurizing pin 10 in Step S14, advancement of the pressurizing pin 10 is caused to start pressurizing (Step S54) right after a predetermined period T0 of time has passed after injection of molten metal (Step S52).

As with the first embodiment, the speed of advancement of the pressurizing pin 10 is controlled according to the reaction force received by the pressurizing pin 10 from molten metal as the pressurizing pin 10 is advanced (Step S56). In this embodiment, however, the pressurizing pin advancement speed is corrected according to pressurizing pin status quantities.

By the term "pressurizing pin status quantities" is meant various physical quantities varying with the advancement of the pressurizing pin or with time. Among the pressurizing pin status quantities are acceleration of the pressurizing pin, advancement speed thereof, resistance offered to the friction between the pressurizing pin and the die, temperature of the free end of the pressurizing pin, and further temperature of the die, temperature of oil hydraulic operating fluid in the oil hydraulic system, temperature of molten metal being injected, temperature of cooling water cooling the die, etc.

In the first embodiment, the opening degree v of the oil hydraulic system valve (i.e., flow control valve 40) for determining the speed of advancement of the pressurizing pin 10 is determine as $$v = f(x) \qquad (1)$$

where x represents the reaction force of molten metal.

While f(x) is a function of the reaction force x, it is possible to use various functions of x, such as liner functions, quadratic functions, etc. in dependence on the characteristics of the pressurizing system for casting.

In contrast, Step S56 in this embodiment features that the various pressurizing pin status quantities noted above are used to correct the opening degree v of the valve. As an example, denoting the acceleration of the pressurizing pin 10 by u, the advancement speed of the pin 10 by w, the resistance offered to the friction between the pressurizing pin 10 and the die by y, and the temperature of the free end of the pressurizing pin 10 by z, the valve opening degree v is determined as $$v=\{f(x), f(u), f(w), f(y), f(z)\} \quad (2)$$

where f(u), f(w), f(y) and f(z) are respectively functions of u, w, y and z, and various functions of u, w, y and z, such as liner functions, quadratic functions, etc., may be used in dependence on the characteristics of the pressurizing system for casting.

Aside from the exemplified equation (2), it is possible to combine necessary pressurizing pin status quantities for correcting the valve opening degree v to an optimum value. It is thus possible to control the speed-of advancement of the pressurizing pin 10 to an optimum value.

Specifically, while advancement of the pressurizing pin 10 is caused (Step S54) when a predetermined period T0 of time has passed after the injection of molten metal (Step S52), the advancement speed at this moment is obtained in the manner as in Step S56 according to the pressure (injecting pressure) received at this instant by the pressurizing pin 10 by molten metal. Subsequently, the flow control valve 40 is controlled to the opening degree v obtained using the equation (2) or the like, and the pressurizing pin 10 is advanced at adequate speed for pressurizing (Step S56).

Subsequent to the control in Step S56, a check is made as to whether a predetermined stroke L1 has been reached by the displacement of the pressurizing pin 10 (Step S58). If the result of the check is "NO", the routine goes back to Step S56, and the pressurizing pin 10 is further advanced under control as described above.

If it comes out that the result of the check in Step S58 is "YES", the pressurizing pin 10 is stopped by the operation of the oil hydraulic system. Then, after the lapse of a further predetermined period of time, the pressurizing pin 10 is retreated to the initial position (Step S60), thus bringing an end to the pressurizing control (Step S62).

Figure 4A:
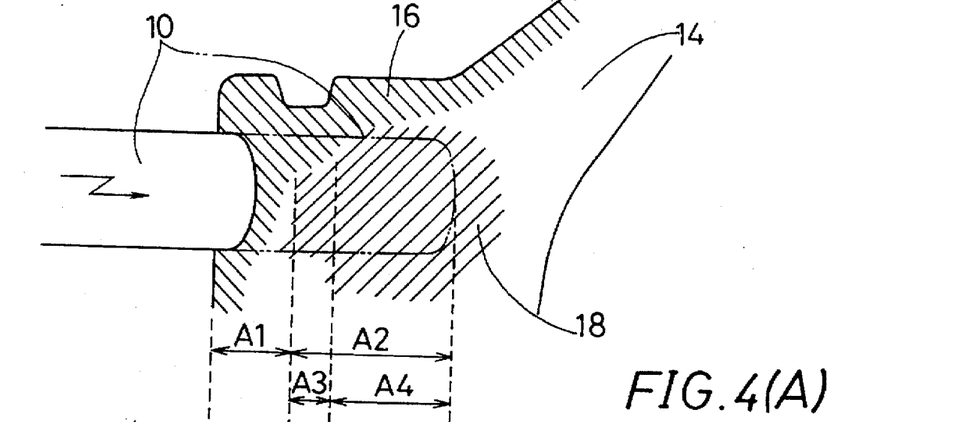
FIGS. 4(A) to 4(C) are a sectional view showing the manner of pressurizing in the pressure casting method according to the second embodiment and graphs showing the results of pressure casting.
Figure 4B:
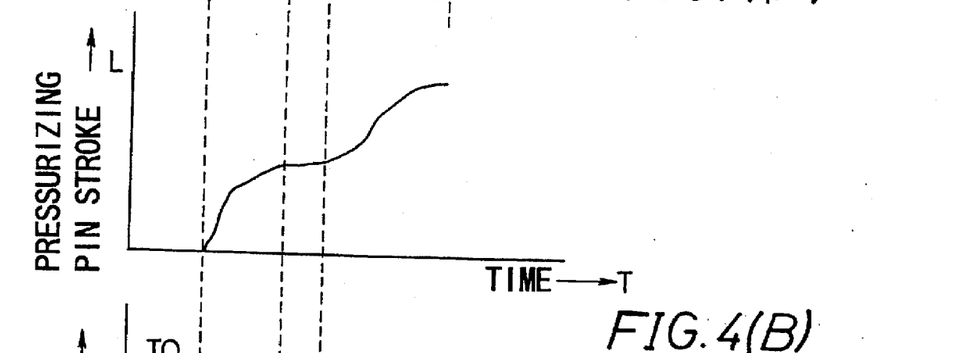

Results obtainable by the pressure casting method will now be described with reference to FIGS. 4(A) to 4(C). FIG. 4(A) is a sectional view illustrating the manner of pressurizing in the pressure casting method of this embodiment. FIG. 4(B) shows the stroke of the pressurizing pin in the pressure casting method of this embodiment plotted against time, and FIG. 4(C) shows the pressure received by the pressurizing pin plotted against time.

As shown in FIG. 4(A), molten metal injected into the cavity 14 with the pressurizing pin 10 held stationary at the retreated position (initial position) shown by the solid line, it is solidified progressively by cooling from its portions in contact with the wall surfaces of the cavity 14. Thus, at the instant when the predetermined time T0 has passed in Step S54 in FIG. 3, molten metal 16 in the neighborhood of the wall surfaces of the cavity 14 and the pressurizing pin 10 is in a state of advanced solidification, while molten metal 18 in other part of the cavity 14 is in a non-solidified state. That is, molten metal is in a state of advanced solidification in range A1 of the stroke of the pressurizing pin 10, while it is in a non-solidified state in range A2.

Figure 4C:
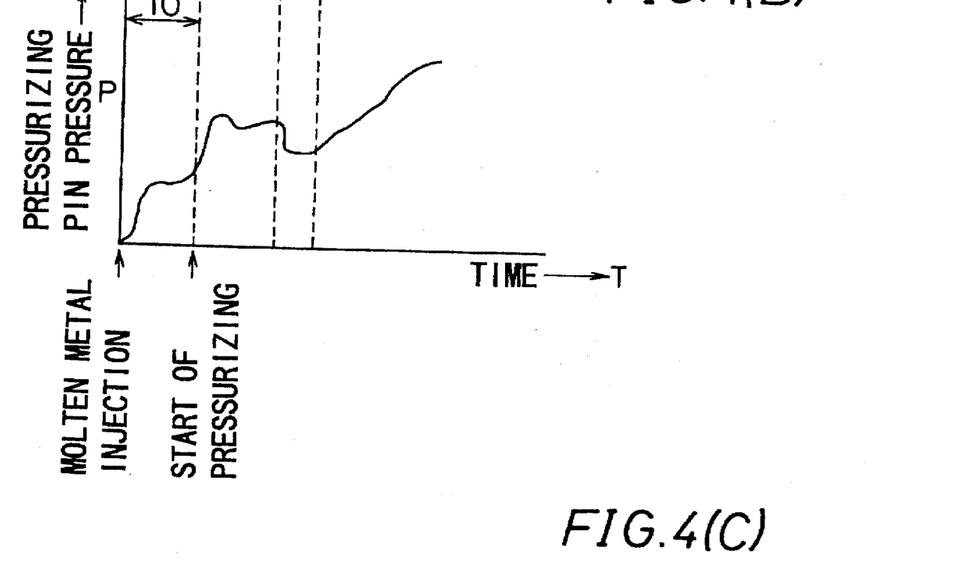

Thus, as shown in FIGS. 4(B) and 4(C), with advancement of the pressurizing pin 10 caused when the predetermined time T0 has passed after the injection of molten metal, high reaction force is received from the molten metal 16 in the state of advanced solidification, thus immediately causing high speed advancement of the pressurizing pin 10 for pressurizing in the range A1. When the pressurizing pin 10 is further advanced to enter the range A2, the reaction force received by the pressurizing pin 10 is reduced because the molten metal 18 is in the non-solidified state. The speed of advancement is thus reduced.

While the pressurizing pin 10 is advanced at low speed in range A3, the solidification of the inner molten metal 18 is advanced progressively to progressively increase the reaction force received by the pressurizing pin 10. Thus, the pressurizing pin 10 is advanced in range A4 while progressively increasing the speed to reach the end of stroke as shown by a phantom line.

In the above way, the pressurizing pin 10 is advanced at a speed which corresponds to a value obtained by correcting the reaction force received by the pressurizing pin 10 with the pressurizing pin status quantity noted above. As shown, by determining the speed of advancement of the pressurizing pin 10 for pressurizing according to the state of solidification of molten metal and the pressurizing pin status quantity, more adequate pressurizing can be obtained over the entire molten metal to be pressurized.

Third Embodiment

Figure 5:
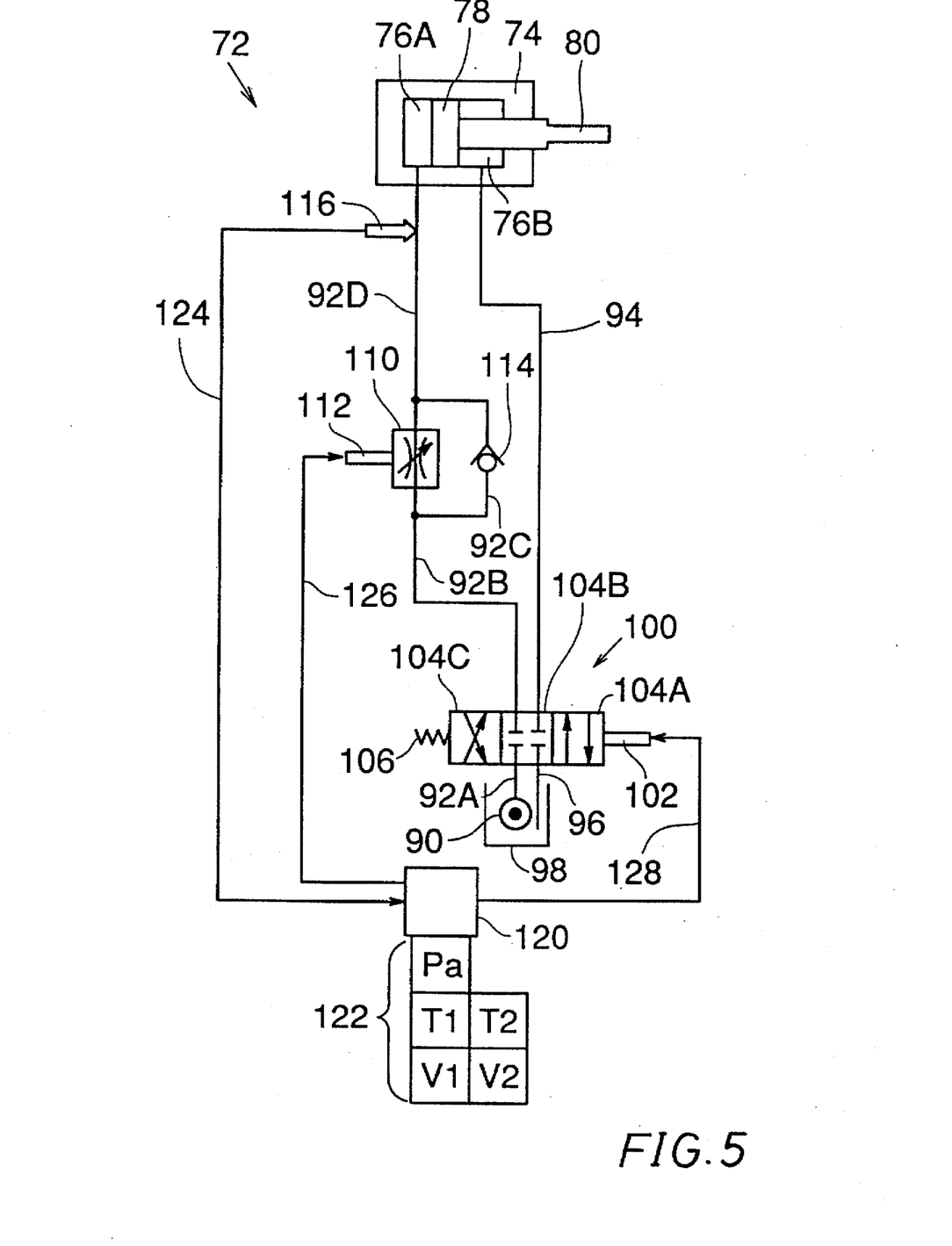
FIG. 5 is a schematic representation of the overall construction of a pressure casting apparatus used in a pressure casting method according to a third embodiment of the invention.
Figure 6:
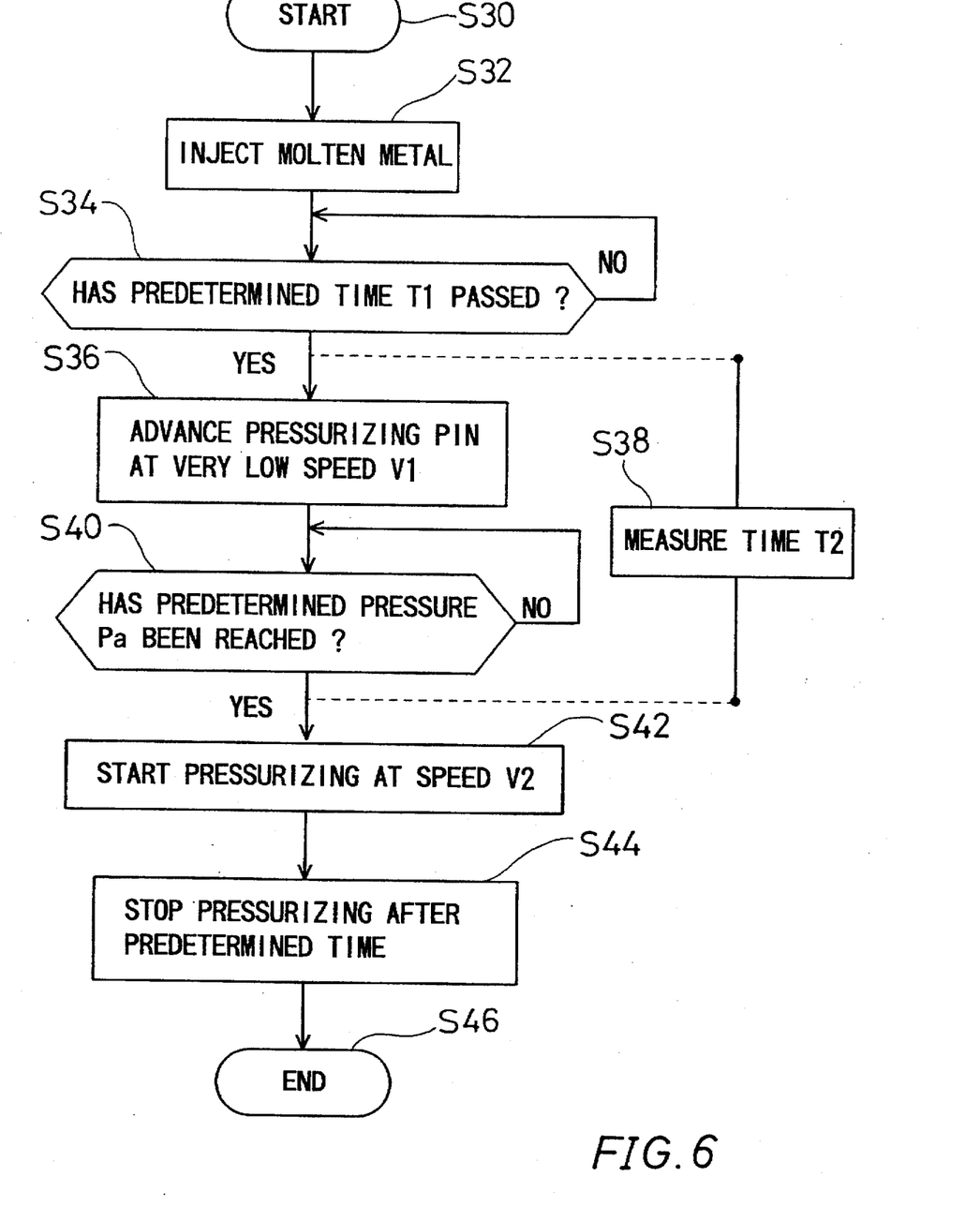
FIG. 6 is a flow chart illustrating a pressure casting routine in the pressure casting method according to the third embodiment.
Figure 7A:
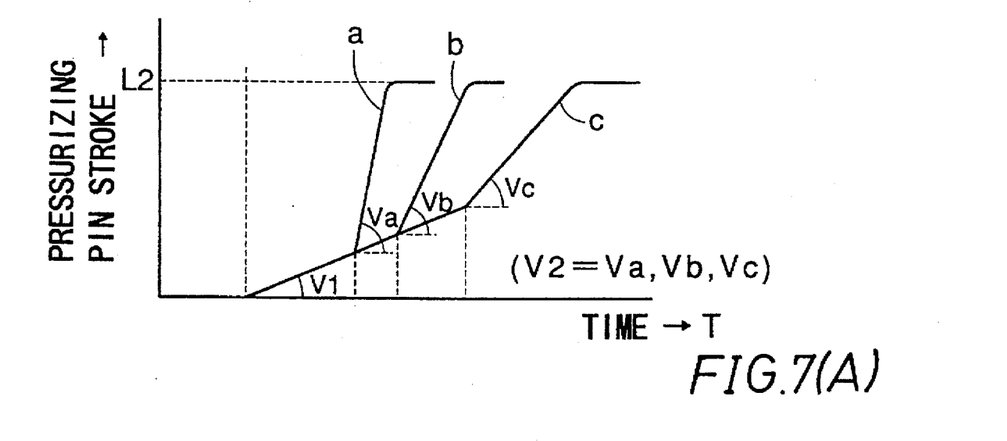
FIGS. 7(A) and 7(B) are graphs showing the results of pressure casting in the pressure casting method according to the third embodiment.

Now, a third embodiment of the invention will be described with reference to FIGS. 5 to 7. First, the overall construction of a pressure casting apparatus 72 used in a pressure casting method of this embodiment will be described with reference to FIG. 5. As shown in FIG. 5, the construction of the pressure casting apparatus 72 of this embodiment is substantially the same as the first embodiment.

Specifically, the pressure casting apparatus 72 as shown has a pressurizing pin 80 which is advanced and retreated in unison with a piston 78 by oil hydraulic pressure led to an oil hydraulic cylinder 74 for pressurizing. The oil hydraulic system includes an oil hydraulic pressure generator 90, an electromagnetic directional control valve 100, a flow control valve 110 and oil hydraulic duct lines connecting these components. The opening degree of the flow control valve 110 and the valve chamber position of the electromagnetic directional control valve 100 are controlled by respective control signals supplied from a control computer 120 via control signal lines 126 and 128.

This embodiment is different from the first embodiment in that a memory 122 of the control computer 120 has storage areas for storing data of predetermined pressure Pa, predetermined time T0 detected time T2, predetermined speed V1 and pressurizing speed V2. The speed of advancement of the pressurizing pin 10 (i.e., opening degree of the flow control valve 110) is controlled according to these data.

Further, in this embodiment, the oil hydraulic cylinder 74 for pressurizing is not provided with any differential transformer for measuring the displacement of the pressurizing pin.

The predetermined pressure Pa corresponds to the reaction force received by the pressurizing pin 80 when the state of solidification of the charged molten metal is suited for commencing the pressurizing. The control computer 120 makes a check as to whether the predetermined pressure Pa has been reached through comparison of the data of the predetermined pressure Pa and the measured pressure data inputted from a reaction force sensor 116 via a signal line 124.

The predetermined time T1 is a waiting period of time from the completion of charging of molten metal till the start of detection of the state of solidification with the pressurizing pin 10 advanced at very low speed. This time T1 has a predetermined value. A check as to whether the predetermined time T1 has passed is made by a counter in the control computer 120.

The detected time T2 is a period of time from the commencement of solidification state detection with the pressurizing pin 10 advanced at very low speed (i.e., step of advancement at very low speed) till the reaching to the predetermined pressure Pa by the reaction force received by the pressurizing pin 80. This time T2 is measured when carrying out the pressure casting, and it is measured by using a counter in the control computer 120.

The predetermined speed V1 is the speed of very low speed advancement of the pressurizing pin 80 in the very low speed advancement step of detecting the state of solidification of molten metal.

The pressurizing speed V2 is the speed of advancement of the pressurizing pin 80 in the pressurizing step. It is a feature of the invention that unlike the prior art, the pressurizing speed V2 is not a predetermined value but is determined by taking the state of solidification of molten metal into consideration whenever pressure casting is carried out. Specifically, as will be described later, the value of the pressurizing speed V2 is determined through computation in the control computer 120 according to the interval of the detected time T2.

The casting process using the pressure casting apparatus 72 having the above construction will be described with reference to the flow chart of FIG. 6 as well as FIG. 5. FIG. 6 is a flow chart illustrating the routine of the pressure casting method of this embodiment.

When the control is started in Step S30, an injecting plunger of the pressure casting apparatus 72 is advanced to charge molten metal into a cavity of a die through a sprue, a runner and a gate thereof (Step S32). When the predetermined time T1 has passed from the completion of charging of molten metal (Step S34), an operation of detecting the state of solidification of molten metal is executed (Step S36). Specifically, the pressurizing pin 80 is caused to undergo very low speed advancement at the predetermined speed V1. At the same time, a counter in the control computer 120 is rendered operative to start measurement of the detected time T2 (Step S38).

Subsequently, a check is made as to whether the predetermined pressure Pa has been reached by the reaction force received by the pressurizing pin 80 (i.e., value of measurement by the pressure sensor 116 (Step S40). The very low speed advancement of the pressurizing pin 80 is continued until the result of the check becomes "YES", and pressurizing of molten metal is started upon reaching the predetermined pressure Pa (Step S42). That is, a great quantity of oil hydraulic operating fluid is supplied to a rear chamber 76A of the oil hydraulic cylinder 74 for pressurizing, thus causing high speed advancement of the pressurizing pin 80 at the predetermined speed V2.

Upon reaching the predetermined pressure Pa by the pressure received by the pressurizing pin 80, the measurement of the detecting time T2 is ended (Step S38), and the measured value of the detected time T2 is stored in the memory 122 of the control computer 120. The control computer 120 determines the adequate value of the pressurizing speed V2 through computation from the measured value of the detected time T2.

Specifically, when the detected time T2 is long, it can be thought that the rate of solidification of molten metal in the cavity has been reduced in dependence on casting condition such as the shape of the cavity and the temperature of molten metal. Accordingly, the advancement speed V2 of the pressurizing pin 80 is set to be smaller so that a zone of molten metal spaced apart from the pressurizing pin 80 is not pressurized while pressurizing has no effect.

When the detected time T2 is short, it can be thought that the rate of solidification of molten metal has been increased. Accordingly, the advancement speed V2 of the pressurizing pin 80 is set to be higher so as to be able to obtain pressurizing before a portion of molten metal spaced apart from the pressurizing pin 80 is solidified.

The control computer 120 controls the opening degree of the flow control valve 110 to provide for the advancement speed V2 which is set in the above way, and the pressuring is started with the pressurizing pin 80 caused to undergo advancement at high speed (Step S42).

After the lapse of a subsequent predetermined period of time, the pressurizing pin 80 is stopped with the valve chamber 104B of the electromagnetic directional control valve 100 connected to each duct line. After the lapse of a further predetermined period of time, the valve 100 is switched to a state that a valve chamber 104C is connected to the duct line, to thereby cause the pressurizing pin 80 to retreat together with the piston 78 to the initial position (Step S44), thus bringing an end to the pressurizing control (Step S46).

After the molten metal has been sufficiently solidified by cooling, the die is opened, and the cast product in the cavity is taken out, thus completing one casting cycle.

As has been described, in the pressure casting method of this embodiment, the pressurizing speed is set adequately according to the solidification rate of molten metal with determination of the advancement speed V2 of the pressurizing pin 80 in the pressurizing step from the time T2 required for the determination of the state of solidification with very low speed advancement. It is thus possible to obtain a pressure casting method which permits sufficient pressurizing effect over the entire molten metal to be pressurized readily and reliably.

Results obtainable with this pressure casting method will be described with reference to FIGS. 7(A) and 7(B). FIG. 7(A) shows the stroke of the pressurizing pin 10 in the pressure casting method of this embodiment plotted against elapsed time. FIG. 7(B) shows the pressure received by the pressurizing pin 10 plotted against elapsed time. In FIGS. 7(A) and 7(B), three different cases a to c are shown, in which the solidification rate of molten metal is different with different casting conditions.

When the predetermined time T1 has passed from the completion of the injection of molten metal, the detection of the state of solidification is started with the pressurizing pin 80 caused to advance at very low speed V1. In FIG. 7(A), the slope of the straight line corresponds to the speed of advancement of the pressurizing pin 80. In any of the cases a to c, the slope of the straight line in FIG. 7(A) in this state.

Figure 7B:
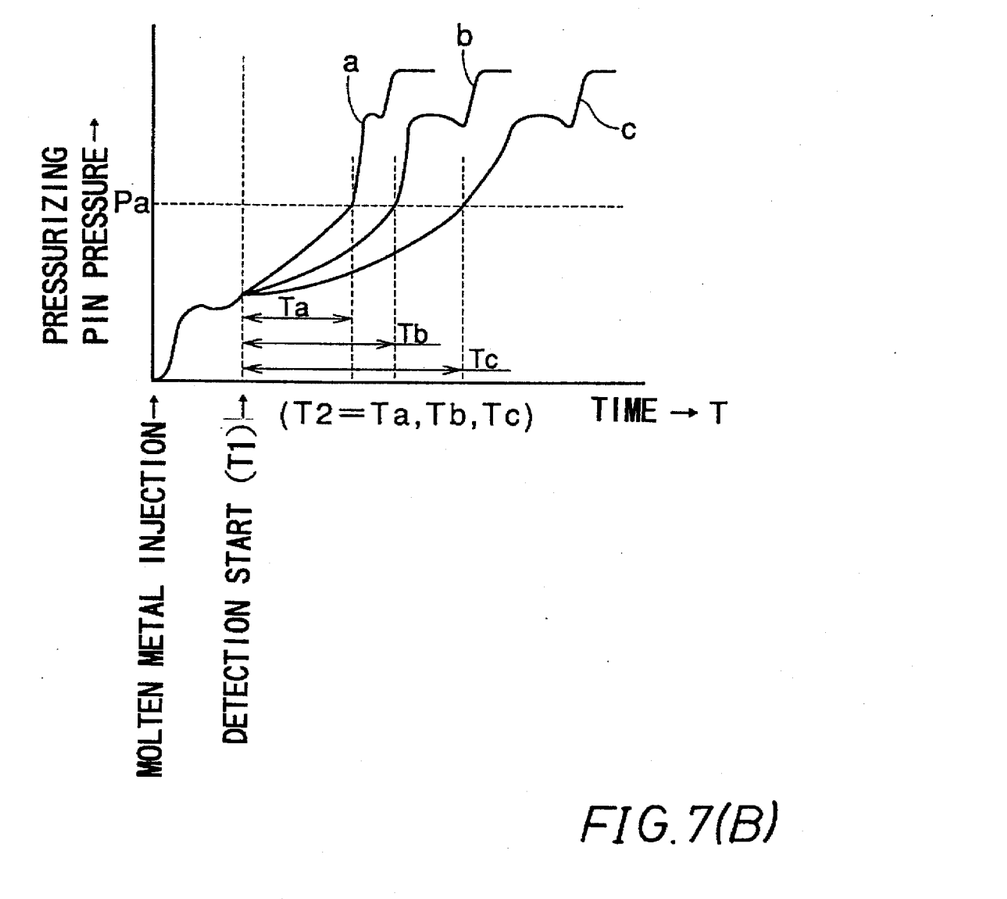

On the other hand, as shown in FIG. 7(B), the reaction force received by the pressurizing pin 80 plotted against time, is given by different curves in the individual cases a to c. In the case a in which the solidification rate of molten metal is high, the predetermined pressure Pa is reached earliest by the reaction force by the pressurizing pin 80 (detection time: T2=Ta). In the case c in which the solidification rate of molten metal is low, the predetermined pressure Pa is reached latest by the reaction force received by the pressurizing pin 80 (detection time: T2=Tc). In the case b in which the solidification rate is intermediate, the obtainable curve is intermediate between the above two curves (detection time: T2=Tb).

When the predetermined pressure Pa is reached, it is judged that a predetermined state of solidification of molten metal has been reached, and the pressurizing pin 80 is switched from very low advancement state over high speed advancement state for pressurizing. As described above, the pressurizing speed V2 is set in correspondence to the individual values Ta to Tc of the detected time T2. More specifically, as shown in FIG. 7(A), the pressurizing speed V2 is set to a large value Va in case of a short detected time Ta, to an intermediate value Vb in case of an intermediate detection time Tb, and to a small value Vc in case of a long detection time Tc.

In the first and the second embodiments described above, the reaction force (i.e., state of solidification) of each portion of molten metal is measured, and the advancement speed of the pressurizing pin is varied correspondingly for each molten metal portion. Thus, there is a merit that fine advancement speed control is made for each portion of the stroke of the pressurizing pin so that it is possible to obtain more excellent pressurizing effect over the entire stroke. On the demerit side, however, such control requires very quick process, that is, the control computer should have high processing speed and require complicated process software.

To cope with this drawbacks, in the pressure casting method of this embodiment, like the prior art pressure casting method, two independent steps, i.e., the very low speed advancement step of reaction force measurement and the pressurizing step of pressurizing molten metal by causing high speed advancement of the pressurizing pin, are executed, and the advancement speed in the pressurizing step is determined according to the measurement time in the very low speed advancement step. Thus, the process speed of the control computer need not be so high, and it is possible to obtain sufficient pressurizing effect easily and reliably over the entire molten metal substantially with the same construction as in the prior art.

In each of the above embodiments, the oil hydraulic cylinder and the oil hydraulic piston for pressurizing were used as oil hydraulic drive means for driving the pressurizing pin. However, it is possible as well to use other oil hydraulic drive means, for instance, an air cylinder, an oil hydraulic motor, an electric motor, etc.

Further, while the pressure received by the pressurizing pin was measured by mounting the pressure sensor on the oil hydraulic duct line, it is possible as well to use other pressure measuring means or mount the pressure measuring means directly on the oil hydraulic cylinder for pressurizing.

Further, the contents of the other steps in the pressure casting method and the constructions, shapes, sizes, materials, quantities, connection relations of other parts of the pressure casting apparatus in the above embodiments are by no means limitative.

In the pressure casting method according to the invention, the advancement speed of the pressurizing pin is determined during pressurizing according to the state of solidification of molten metal. Thus, pressurizing can be obtained with advancement speed corresponding to the state of solidification of each portion of molten metal, so that it is possible to obtain sufficient pressurizing effect at all times for each portion of the pressurizing stroke of the pressurizing pin.

It is thus possible to provide a practically useful pressure casting method which permits sufficient pressurizing effect to be obtained over the entire molten metal to be pressurized, thus steadily obtaining high quality cast product free from defects such as sink marks and shrinkage cavities that might otherwise be generated with the solidification and shrinkage of molten metal.

As a further effect of the invention, since the pressurizing speed is set in correspondence to variations of casting conditions, it is possible to absorb variations of the casting conditions such as the die temperature and the molten metal temperature. Thus, it is possible to reduce the defective cast product factor and the number of discarded products. Further, no temperature control is needed, thus permitting cost reduction of the peripheral equipment.

Further, while in the prior art pressure casting system where the pressurizing speed is set in advance, it has been necessary to set the pressurizing speed adequately by taking the cavity shape and so forth into consideration, thus requiring a considerable additional number of steps. According to the invention such steps are not needed at all because the pressurizing pin is advanced while setting the optimum pressurizing speed for each portion of the pressurizing pin stroke.

What is claimed is:

1. A pressure casting method comprising the steps of:
   charging molten metal into a cavity;
   pressurizing the molten metal by advancing a pressuring pin into the charged molten metal during solidification of the charged molten metal;
   measuring a reaction force received by the pressurizing pin from the molten metal during the advancement of the pressurizing pin;
   controlling a speed of advancement of the pressurizing pin in response to the measured reaction force by increasing the speed as the reaction force measured in the reaction force measuring step increases and reducing the speed as the measured reaction force decreases; and
   repeatedly executing the reaction force measurement step and the advancement speed control step.

2. The pressure casting method according to claim 1, comprising the further step of increasing an output of an actuator for causing advancement of the pressurizing pin as the speed of advancement of the pressurizing pin is increased.

3. The pressure casting method according to claim 2, comprising the further step of determining the output of the actuator on the basis of the reaction force measured in the reaction force measuring step.

4. The pressure casting method according to claim 2, comprising the further step of determining the output of the actuator on the basis of the reaction force measured in the reaction force measuring step and the speed of advancement of the pressurizing pin.

5. The pressure casting method according to claim 2, comprising the further step of determining the output of the actuator on the basis of the reaction force measured in the reaction force measuring step and a temperature of a free end of the pressurizing pin.

6. The pressure casting method according to claim 2, wherein the actuator includes an oil hydraulic pump, an oil hydraulic cylinder and a duct line connecting the pump and the cylinder, the method comprising the further step of controlling the output of the actuator by a flow control valve incorporated in the duct line.

7. The pressure casting method according to claim 1, comprising the further step of controlling an initial speed of advancement of the pressurizing pin to a very low speed.

8. A pressure casting method comprising the steps of:

charging molten metal into a cavity;

pressurizing the molten metal by advancing a pressurizing pin into the charged molten metal during a solidification of the charged molten metal;

advancing the pressurizing pin at a very low speed after the molten metal has been charged into the cavity;

measuring a reaction force received by the pressurizing pin by the molten metal during the very low speed advancement of the pressurizing pin;

measuring time until a predetermined value of the reaction force measured by the reaction force measuring step is reached;

increasing the speed of advancement of the pressurizing pin to a speed for pressurizing upon reaching the predetermined value of the reaction force measured in the reaction force measuring step; and determining the speed for pressurizing on the basis of the time measured in the time measuring step.

9. The pressure casting method according to claim 8, comprising the further steps of increasing the speed of pressurizing as the time measured in the time measuring step decreases, and decreasing the speed of pressurizing as the time measured in the time measuring step increases.

* * * * *

UNITED STATES PATENT AND TRADEMARK OFFICE
CERTIFICATE OF CORRECTION

PATENT NO. : 5,671,797
DATED : September 30, 1997
INVENTOR(S) : Mikiya NOZAKI, et al.

It is certified that error appears in the above-indentified patent and that said Letters Patent is hereby corrected as shown below:

On the title page, item [*] has been omitted, it should be:

--[*] Notice: The term of this patent shall not extend beyond the expiration date of Pat. No. 5,623,984.--

On the title page, item [45] should be:

--[45] Date of Patent: *Sep. 30, 1997--

Signed and Sealed this

Twenty-sixth Day of September, 2000

Attest:

Q. TODD DICKINSON

Attesting Officer     Director of Patents and Trademarks